United States Patent Office 3,084,057
Patented Apr. 2, 1963

3,084,057
GUM SOLS OF IMPROVED HEAT STABILITY
Wesley A. Jordan, Minneapolis, Minn., assignor to General Mills, Inc., a corporation of Delaware
No Drawing. Filed Jan. 27, 1960, Ser. No. 4,886
10 Claims. (Cl. 106—205)

The present invention relates to the method of preparing sols of water soluble gums of stabilized viscosity. More particularly, it relates to the stabilization of the viscosity of sols prepared from water soluble gums by the incorporation therein of novel viscosity stabilizing agents and to the compositions thus obtained.

The sols formed when a water soluble dispersible gum is mixed with water find use in a wide variety of industrial applications. In many of these applications the viscosity of the sol is an important factor in accomplishing the purpose for which the sol is to be used. In a significant number of these applications it is necessary that the sol be exposed to elevated temperatures (over 0° F.) for extended periods of time. In some instances this is necessary because the sol must be used in the form of a hot liquid to obtain satisfactory results, e.g. its use as a sizing agent for textiles and paper. In still other instances, the sol may become hot in use, e.g. the use of brine sols as agents to control the loss of fluid from well completion and workover in oil well drilling operations. Unfortunately the sols of water soluble gums when they are exposed to elevated temperatures for any extended length of time, lose in part or in whole their voscosity producing properties and therefore become less or wholly ineffective.

It is therefore an object of the present invention to disclose a process of stabilizing the viscosity of water soluble gum sols at elevated temperatures by incorporating therein novel viscosity stabilizing agents.

It is also an object of the present invention to provide novel compositions of matter composed of water soluble gums and novel viscosity stabilizing agents.

I have now made the unexpected discovery that the above and still further objects may be accomplished adding to the water soluble gum a water soluble thio-organic compound, i.e. one which contains a —C=S group.

While in the preferred practice of the invention the viscosity stabilizing agent is either dry mixed with the gum or added to the gum as a solution, it is also possible if desired to stabilize the viscosity by adding a solution containing the viscosity stabilizing agent to an already prepared gum sol.

The water soluble gums to which the present invention has been found to be generally applicable are the galacto mannan gums such as locust bean gum, guar, and the like; the pathogenic exudats such as karaya gum, tragacanth, gum arabic and the like; the xylogalactans such as tamarind seed gum, psyllium seed; the gluco mannans such as konyaku; the alginates; and Irish moss and the like.

The compounds contemplated for use in the present invention as viscosity stabilizing agents are those water soluble organic compounds which contain the thio or —C=S group. Representative of such compounds are thiourea, potassium ethyl xanthate, sodium ethyl xanthate, and ammonium thiocyanate which changes to thiocarbamid on heating, and the like. In general the addition of these compounds even in minor amounts and up to 10% by weight of the gum provides satisfactory results. Larger amounts than 10% may of course be used but in general for no additional advantage. In the preferred practice of my present invention, I find it desirable to use from 1 to 5% by weight of the compound thiourea. Even such minor amounts as 0.1% have been found to materially improve the heat stability of sols. In addition to the gum and the water soluble thio-organic compound, the novel compositions of the present invention may, of course, contain other ingredients. In some instances, I have found it desirable to further stabilize the viscosity to incorporate small amounts (1% or less) of an aldehyde such as pyruvic aldehyde, ortho-sulfobenzaldehyde, acetaldehyde, formaldehyde, metamethoxyparahydroxybenzaldehyde and the like. It has also been my experience that the addition of minute amounts of zinc salts, that is less than 2% by weight of the gum, also enhances the stabilizing effect when a xanthate is used as the viscosity stabilizing agent.

My present invention may be more fully understood by considering the following examples which are for illustrative purposes only. They may obviously be modified without departing from my invention and I therefore do not intend to limit my invention to the specific embodiments set forth. All parts are given therein by weight.

*Example I*

95 parts of guar gum were dry mixed with 5 parts of thiourea. 4 parts of the above mixture was then dispersed in 396 parts of a saturated sodium chloride solution. The mixture was stirred until 1000 cps. viscosity developed (Brookfield No. 3 spindle 20 r.p.m.). After being heated to 164° F. and held there for 4 hours the viscosity of the blended mixture was 3225 cps. whereas a control which did not contain the thiourea, but had otherwise received the identical treatment had a viscosity of 775 cps.

The following Examples II to VI show the preparation of dry solid compositions. A table at the end of Example VI shows the results obtained.

*Example II*

To 95 parts of guar gum was added 20 parts of solution containing 5 parts thiourea and 15 parts water. The gum and solution mixture was mulled in a mortar with a pestle until the solution was thoroughly distributed. The soft granular product was then dried in an oven at 122° C. for 3 minutes to remove 15 parts of water. The resulting product was dry and granular.

*Example III*

The procedure of Example II was repeated substituting potassium ethyl xanthate for thiourea. A dry granular product was obtained.

*Example IV*

For comparison purposes the procedure of Example II was repeated substituting urea for thiourea. A dry granular product was obtained.

*Example V*

95 parts of guar gum are treated with 20 parts of a solution containing 15 parts water, 1 part ortho-sulfobenzaldehyde and 4 parts thiourea. The mixture was mulled in a mortar with pestle until the additives were well distributed. The soft granular product was dried in an oven at 110 to 120° C. until 15 parts of water were lost. A sweet smelling granular product was obtained.

*Example VI*

95 parts of guar gum were treated with 20 parts of an aqueous solution containing 4.75 parts thiourea, 0.25 part pyruvic aldehyde and 15 parts water. The mixture was mulled until thoroughly mixed. The soft granular product was dried at 110 to 120° C. until 15 parts water had evaporated. A dry granular product was obtained.

The products prepared in Examples II, III, IV, V and VI were tested by dispersing 4 g. each in 396 g. of 20% NaCl. Each dispersion was made in a 1 pint mason jar and each sol was stirred and heated to 172° F. in 5 minutes in a steam bath. The jars were loosely capped and transferred to an oven heated at 172° F. Using a Brookfield viscometer at 20 r.p.m., #3 spindle, the viscosities were determined after 1 hour, 4 hours, 20 hours, 27 hours, 48 hours and 70 hours of heating at 172° F. The sol temperature was 172° F. when viscosity was determined. A total of 6 samples were tested. Five were the products from experiments II through VI. One was the control comprising a sample of the original untreated guar gum. The following table shows the products tested and the viscosity of each when maintained at 172° F. for various periods of time.

| 1% Sol Made From— | Viscosity in Centipoises of 20% Brine Sols at 172° F. After Sol Was Heated | | | | | |
|---|---|---|---|---|---|---|
| | 1 Hr. | 4 Hrs. | 20 Hrs. | 27 Hrs. | 48 Hrs. | 70 Hrs. |
| Guar Gum | 25 | <25 | | | | |
| Example II | 1,550 | 1,400 | 1,250 | 1,200 | 1,150 | 1,050 |
| Example III | 1,525 | 1,275 | 1,050 | 875 | 725 | 550 |
| Example IV | <25 | | | | | |
| Example V | 1,650 | 1,625 | 1,400 | 1,325 | 1,225 | 1,175 |
| Example VI | 1,600 | 1,775 | 1,575 | 1,475 | 1,275 | 1,125 |

In following the viscosities of hot 1% brine sols over 70 hours, it is obvious that all gums treated with the thioorganic compounds exhibited improved stability. The ones treated with aldehyde in addition to thiourea were better than when thiourea alone was used and the product resulting from Example IV (guar treated with urea) was less satisfactory than guar gum.

Samples of the above gums were also checked using distilled water. Each gum was first hydrated in cold water and stirred for 5 hours. Sols were made in 1 point mason jars. After 5 hours swelling the jars were loosely capped and placed in a 172° F. hot water bath. In 30 minutes all sols reached 172° F. At this point viscosity was determined. The jars were placed in a 172° F. oven and the viscosity taken 72 hours later.

| 1% Sol Made From Product | Viscosity[1] After Swelling 5 Hrs. and Heating to 172° F., cps. | Viscosity[1] After Heating at 172° F. for 72 Hours, cps. |
|---|---|---|
| Guar Gum | 2,175 | <25 |
| Example II | 1,900 | 1,875 |
| Example III | 1,925 | 725 |
| Example IV | 1,900 | <25 |
| Example V | 2,025 | 1,450 |
| Example VI | 1,825 | 350 |

[1] Viscosity taken at 172° F.

*Example VII*

5 sols were prepared each containing 4 g. of guar in 396 g. of 20% NaCl solution. To 4 of the sols there was added respectively .1%, .5%, 1.0%, 2.0% of thiourea based on the weight of the gum. To the fifth sol nothing was added. The 5 sols were then heated in an oven at 175° F.

The following table shows the viscosity of each when maintained at 175° F. for various periods of time.

| 1% Sol | Percent Thiourea | Viscosity[1] After Heating 3 Hours at 175° F. | Viscosity[1] After Heating 15 hours at 175° F. |
|---|---|---|---|
| 1 | .1 | 480 | 150 |
| 2 | .5 | 1,470 | 1,010 |
| 3 | 1.0 | 1,850 | 1,480 |
| 4 | 2.0 | 2,040 | 1,750 |
| 5 | 0 | 180 | 40 |

[1] Viscosity taken at 175° F.

*Example VIII*

A 1% sol in 20% NaCl brine was made using the product from Example III. The sol was split into two portions. To one portion nothing was added. To the other 1% $ZnCl_2$ based on the weight of the gum present was added. Both sols were heated at 176° F. for 23 hours. The sol which had nothing added had a viscosity of 775 cps. The sol with $ZnCl_2$ added had a viscosity of 850 cps. Viscosities were taken at 176° F. on both sols.

*Example IX*

95 parts of locust bean gum was mixed with 20 parts of a solution containing 15 parts water and 5 parts thiourea. The mixture was mulled until the solution was thoroughly distributed. After mixing, the mix was dried in an oven at 110 to 120° C. until 15 parts of water had been removed. This product was cooled and compared with untreated locust bean gum. The viscosities of 1% sols in 20% brine solution at 175° F. were:

| 1% Sols of— | Heated at 175° F. for— | | | |
|---|---|---|---|---|
| | 1 Hr., cps. | 15 Hrs., cps. | 21 Hrs., cps. | 41 Hrs., cps. |
| LB gum | 775 | 275 | 200 | 95 |
| 95% LB gum+5% thiourea | 500 | 380 | 375 | 300 |

*Example X*

Example IX was repeated using karaya gum in place of locust bean gum. Sols were made at 2% concentration in 20% brine solution and heated at 175° F. for several hours.

| 2% Sols of— | Viscosity of Sols Heated at 175° F. for— | | |
|---|---|---|---|
| | 3 Hrs., cps. | 7 Hrs., cps. | 10 Hrs., cps. |
| Karaya | 800 | 350 | 175 |
| 95% Karaya+5% thiourea | 650 | 850 | 575 |

*Example XI*

95 parts of sodium alginate was dry blended with 5 parts of thiourea. Two sols were prepared in 20% NaCl solution. One of the sols contained 2% of the above described mixture of sodium alginate and thiourea, the other sol which was intended to serve as a control contained 2% of sodium alginate and no thiourea. Both sols were heated to 170° F. and held 24 hours. Their respective viscosities were:

| 2% Sols of— | Viscosity of 2% Sols Heated 24 Hrs. at 170° F. | |
|---|---|---|
| | Hot[1] 172° F. cps. | Cold[1] 77° F. cps. |
| Na alginate | 850 | 2,950 |
| 95% Na alginate+5% thiourea | 1,500 | 4,800 |

[1] The above sol viscosities were taken at 170° F. and at 77° F., i.e. after the hot sol cooled.

It will be readily apparent to those skilled in the art that by the exercise of the present invention it is possible to prepare sols which have increased viscosity stability at elevated temperatures.

The embodiments of the invention in which an exclusive propery or privilege is claimed are defined as follows:

1. A composition of matter comprising a water-soluble gum selected from the group consisting of galacto mannan gums, pathogenic exudate gums, xylogalactan gums, gluco mannan gums, alginate gums, and Irish moss gums, and a heat stabilizing amount of a water-soluble thio-organic compound.

2. The composition of claim 1 in which the water-soluble thio-organic compound is thiourea.

3. The composition of claim 1 in which the water-soluble thio-organic compound is potassium ethyl xanthate.

4. The composition of claim 1 in which the water-soluble gum is guar.

5. The composition of claim 1 in which the water-soluble gum is locust bean gum.

6. The composition of claim 1 in which the water-soluble gum is karaya gum.

7. A sol prepared from a water-soluble gum selected from the group consisting of galacto mannan gums, pathogenic exudate gums, xylogalactan gums, gluco mannan gums, alginate gums, and Irish moss gums containing a water-soluble thio-organic compound in an amount in the range of 0.1% to 10% by weight, based on the weight of the gums.

8. A composition of matter which comprises water-soluble gum selected from the group consisting of galacto mannan gums, pathogenic exudate gums, xylogalactan gums, gluco mannan gums, alginate gums, and Irish moss gums, and a heat stabilizing amount of water-soluble xanthate.

9. A process of stabilizing viscosity of water-soluble gum selected from the group consisting of galacto mannan gums, pathogenic exudate gums, xylogalactan gums, gluco mannan gums, alginate gums, and Irish moss gums, which comprises incorporating a heat stabilizing amount of a water-soluble thio-organic compound in said sol.

10. The mixture which comprises a dry water-soluble gum wherein said gum is selected from the group consisting of galacto mannan gums, pathogenic exudate gums, xylogalactan gums, gluco mannan gums, alginate gums, and Irish moss gums, containing 0.1% to 10% by weight, based on the weight of the gum, of a water-soluble thio-organic compound.

References Cited in the file of this patent

UNITED STATES PATENTS 2,215,847   Bauer _____ Sept. 24, 1940

FOREIGN PATENTS 508,135   Great Britain _____ June 17, 1939

UNITED STATES PATENT OFFICE
CERTIFICATE OF CORRECTION

Patent No. 3,084,057                            April 2, 1963

Wesley A. Jordan

It is hereby certified that error appears in the above numbered patent requiring correction and that the said Letters Patent should read as corrected below.

Column 1, line 20, for "0" read -- 100 --; line 31, for "voscosity" read -- viscosity --; column 3, line 34, for "point" read -- pint --.

Signed and sealed this 19th day of November 1963.

(SEAL)
Attest:

ERNEST W. SWIDER                          EDWIN L. REYNOLDS

Attesting Officer                          Acting Commissioner of Patents